Figure 1:
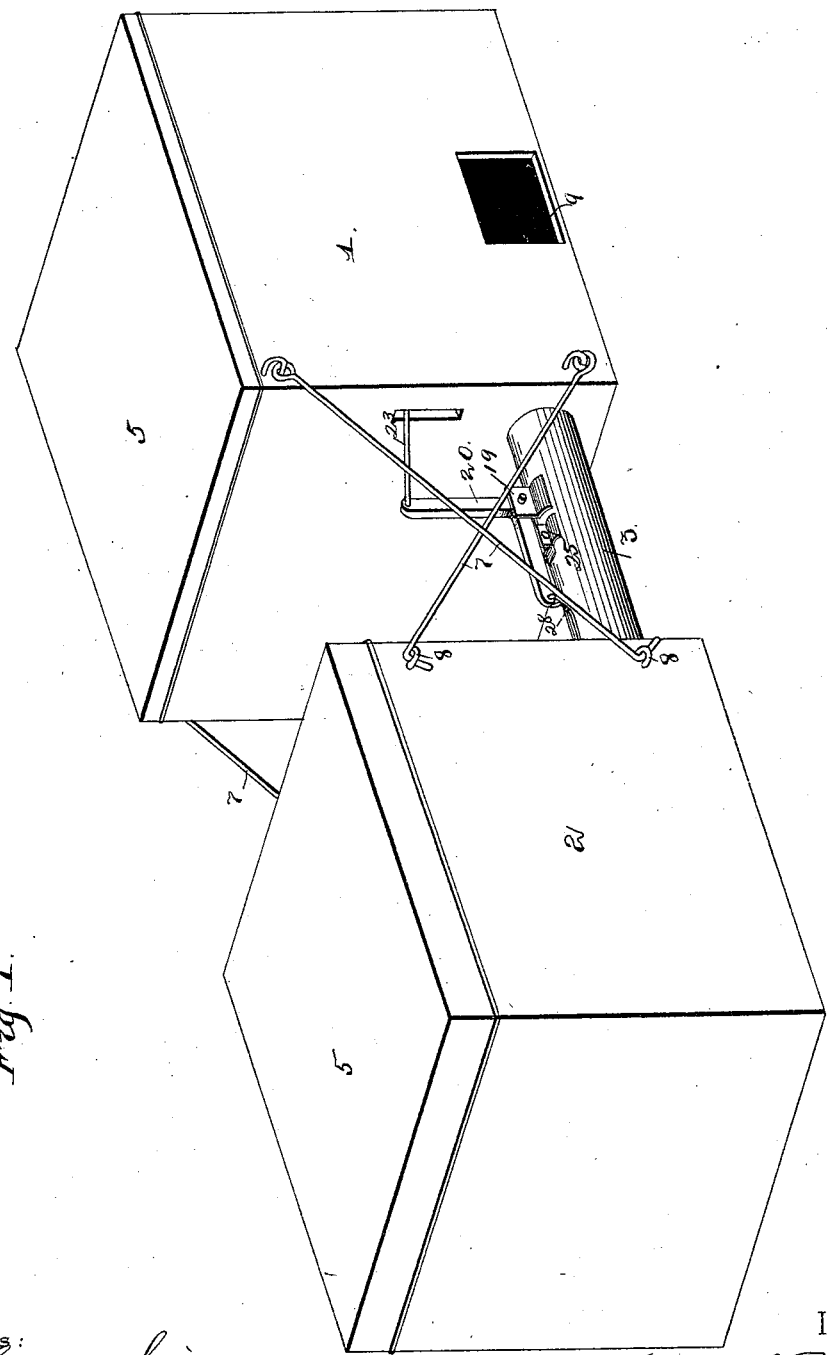

L. H. DOWELL.
SELF SETTING TRAP.

(No Model.) 2 Sheets—Sheet 1.

No. 455,313. Patented July 7, 1891.

(No Model.) 2 Sheets—Sheet 2.
L. H. DOWELL.
SELF SETTING TRAP.
No. 455,313. Patented July 7, 1891.
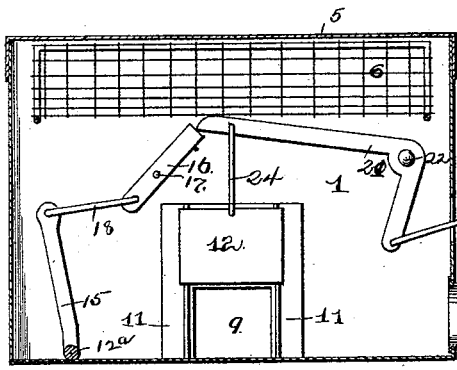
Fig. 3.
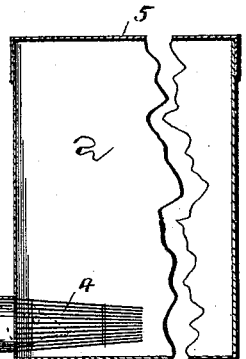
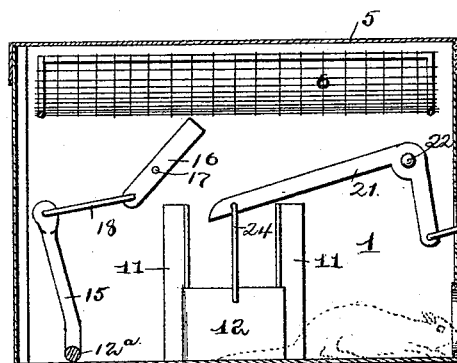
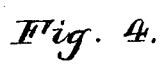
Fig. 4.
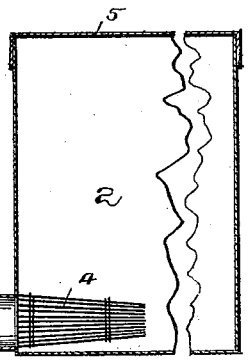
Fig. 2.
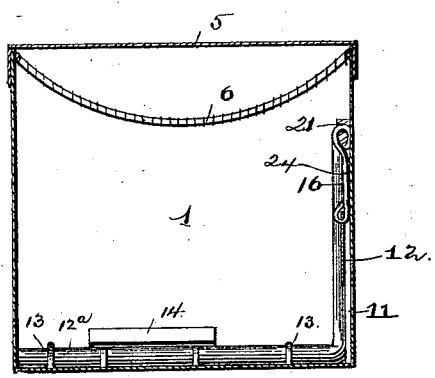
Witnesses: Inventor
H. Grant Seitz. Lawson H. Dowell,
W. S. Duvall. By his Attorneys,
C. A. Snow & Co.

UNITED STATES PATENT OFFICE.

LAWSON HENREY DOWELL, OF WALTON, TEXAS.

SELF-SETTING TRAP.

SPECIFICATION forming part of Letters Patent No. 455,313, dated July 7, 1891.

Application filed August 15, 1890. Serial No. 362,108. (No model.)

*To all whom it may concern:*

Be it known that I, LAWSON HENREY DOWELL, a citizen of the United States, residing at Walton, in the county of Van Zandt and State of Texas, have invented a new and useful Self-Setting Trap, of which the following is a specification.

This invention has relation to that class of traps known as "self-setting," or, in other words, the capture of an animal serves to set the trap for another animal.

The objects in view are to simplify and cheapen the construction and form a durable trap in which the bait is held against molestation, and which may be employed to successively catch and confine all animals that may pass therein.

Other objects and advantages of the invention, together with the novel features thereof, will be particularly pointed out in the claims.

Referring to the drawings, Figure 1 is a perspective of a trap constructed in accordance with my invention. Fig. 2 is a transverse section through the first chamber. Fig. 3 is a longitudinal section through the two chambers, the trap being set. Fig. 4 is a similar view, the trap being closed.

Like numerals of reference indicate like parts in all the figures of the drawings.

In practicing my invention I employ two chambers, preferably formed of sheet metal, and designate them as the "entrapping-chamber" 1, and the "confining-chamber" 2. The two chambers are connected by means of a metal passage 3 of a diameter sufficient to barely receive and permit the passage therethrough of an animal of the species to be entrapped. The passage 3 at that end entering the confining-chamber is provided with a contracted wire exit 4 of the class usually employed in traps, which permits of the entrance or squeezing through of the animal, and yet prevents its exit. Each of the chambers is provided with doors 5 or lids preferably hinged in position, and the entrapping-chamber is provided with a curved wire basket or lid 6, between which and the lid proper 5 is to be confined the bait, which latter, as will hereinafter appear, may be used indefinitely. The two chambers are connected by means of opposite pairs of connecting-wires 7, said wires being permanently but loosely connected to the exterior of the entrapping-chamber and designed for removable connection with staples or eyes 8, extending from the exterior of the confining - chamber. The entrapping-chamber is provided with a door-opening 9, at each side of which is located a vertical way 11, in which is mounted for movement a door 12, arranged to open and close the opening 9.

12ª designates a rock-shaft mounted in bearings 13 upon the floor and at one side of the entrapping-chamber, said rock-shaft carrying a treadle 14, normally elevated and at one end bent to form a crank-arm 15.

16 designates a gravity-latch pivoted, as at 17, to one side and slightly above the door-opening, and by a rod 18, loosely connected to the bent arm 15 of the rock-shaft. The normal tendency of the latch is to remain with its upper portion thrown toward the door.

19 designates a pair of bearing-ears located upon the cylindrical passage 3, and within the same is pivoted a bell-crank lever 20. A lever 21 is pivotally connected at its outer or rear end, as at 22, to the interior of the chamber 1, and is of bell-crank shape, the lower end of the bell-crank being by a rod 23 connected to the upper end of the bell-crank 20, said rod extending through the wall of the chamber. The free end of the lever 21 is chamfered upon its upper side, and in rear of the same a slight distance is by a link 24 connected to the sliding or reciprocating door 12, so that at an elevation of the lever 21 the door is raised and the chamfered end of said lever rides under and tilts the gravity-latch 16 and takes over the upper end of the same, said latch dropping into a locked position, and thus supporting the door above its opening.

25 designates a pair of bearing-ears located in front of the bearing-ears 19, and in the same is pivoted a loose gate 26, which normally closes the passage 3. An opening 27 is formed in the passage above the free end of the gate, and through said opening is passed a connecting-wire 28, which connects the free end of the gate with the lower branch of the bell-crank 20.

This being the construction, the operation is as follows: A rat passing into the trap through the opening 9 after the trap has been set seeks the bait and naturally gets upon the most elevated object in order to reach the bait. This is the treadle 14, and his weight is sufficient to tilt the same and rock the shaft, throwing the arm 15 toward the door and tilting the gravity-latch. This removes the support from the bell-crank 21, and the door 12, which is weighted, drops by gravity, closing the door-opening 9. The rat in his endeavors to escape from the inclosure seeks the first opening at hand, which is the passage 3, and seeing nothing to obstruct his passage passes through the same until he comes in contact with the gravity-gate. This gate is formed of light sheet metal and readily yields to his pressure, and through it he passes and into the confining-chamber, from which he cannot escape unless removed by the attendant. As he passes under the gravity-gate, he elevates the free end of the same and tilts the bell-crank 20, thus raising the bell-crank 21 so that it rides above and is engaged by the gravity-latch 16, when it will be observed that the trap is again set, and thus the operation of successively capturing the vermin may be proceeded with indefinitely, the captured animals all being out of sight from any animal entering the trap. By disconnecting the wires 7 the confining-chamber may be removed and the vermin killed.

Having described my invention, what I claim is—

1. The combination, with an entrapping and a confining chamber, of a passage connecting the two and provided with a gravity-gate, a door mounted in the entrapping-chamber, a locking mechanism located at one side of the door, a rock-shaft for operating the same and provided with a horizontally-disposed platform or treadle adapted to be lowered by the weight of the animal, and devices arranged between the door and the gravity-gate, whereby an opening of the gate raises the door, which is engaged by the locking mechanism, substantially as specified.

2. In a trap, the combination, with a chamber having an opening and a reciprocating door, of a rock-shaft bent to form a rock-arm, a gravity-latch pivoted above and at one side of the door and adapted to support the door, a connecting-rod between the gravity-latch and the rock-arm, a treadle mounted upon the rock-shaft, and a bait-receptacle located above the treadle, substantially as specified.

3. In a trap, the combination, with an entrapping-chamber and a confining-chamber and a passage connecting the two, of a sliding door mounted in the entrapping-chamber, a pivoted bell-crank connected with the door at one end and chamfered, a bell-crank mounted on the passage and having its upper branch connected with the lower branch of the bell-crank of the door, a gravity-gate pivoted in the passage and loosely connected at its free end to the lower end of the bell-crank of the passage, a rock-shaft mounted in the entrapping-chamber, provided with a treadle, and bent to form a rock-arm, a gravity-latch pivoted above the door-opening and adapted to engage the chamfered end of the bell-crank in said chamber, a rod connecting the lower end of the gravity-latch with the rock-arm, and a frame located in the upper end of the chamber and adapted to receive a bait, substantially as specified.

In testimony that I claim the foregoing as my own I have hereto affixed my signature in presence of two witnesses.

LAWSON HENREY DOWELL.

Witnesses:
T. F. BROUN,
J. B. MESSER.